United States Patent
Leyden et al.

(10) Patent No.: US 7,752,800 B2
(45) Date of Patent: Jul. 13, 2010

(54) SYSTEM FOR SECURING A FISHING REEL TO A SUPPORT

(75) Inventors: Roger Leyden, Inverness, IL (US); Kris Michael Southerland, Palatine, IL (US)

(73) Assignee: Se-Kure Controls, Inc., Franklin Park, IL (US)

( * ) Notice: Subject to any disclaimer, the term of this patent is extended or adjusted under 35 U.S.C. 154(b) by 20 days.

(21) Appl. No.: 11/295,245

(22) Filed: Dec. 6, 2005

(65) Prior Publication Data

US 2007/0124983 A1 Jun. 7, 2007

(51) Int. Cl.
*A01K 87/06* (2006.01)

(52) U.S. Cl. ........................................................ 43/22

(58) Field of Classification Search ................. 43/21.2, 43/22, 25; 42/124–127; D22/108
See application file for complete search history.

(56) References Cited

U.S. PATENT DOCUMENTS

| | | | | |
|---|---|---|---|---|
| 718,589 | A * | 1/1903 | Treadwell | 43/22 |
| 802,027 | A * | 10/1905 | Bishop | 43/25 |
| 858,881 | A * | 7/1907 | Letterman | 43/22 |
| 887,437 | A * | 5/1908 | Smith | 43/22 |
| 930,181 | A * | 8/1909 | Huffman | 43/22 |
| 1,015,009 | A * | 1/1912 | Dineen | 43/22 |
| 1,132,105 | A * | 3/1915 | Mauser | 42/127 |
| 1,382,545 | A * | 6/1921 | Price | 43/22 |
| 1,464,154 | A * | 8/1923 | Hooper | 43/22 |
| 1,830,558 | A * | 11/1931 | Olson | 24/275 |
| 1,883,041 | A * | 10/1932 | Somers | 24/285 |
| 1,995,242 | A * | 3/1935 | Clarke | 43/22 |
| 2,022,204 | A * | 11/1935 | Kovalovsky | 242/249 |
| 2,028,609 | A * | 1/1936 | Irwin | 24/279 |
| 2,038,344 | A * | 4/1936 | Clarke | 43/22 |
| 2,089,538 | A * | 8/1937 | Clarke | 43/22 |
| 2,111,080 | A * | 3/1938 | Stromgren | 43/22 |
| 2,143,289 | A * | 1/1939 | Toolan | 43/22 |
| 2,151,768 | A * | 3/1939 | Humeston | 42/124 |
| 2,182,468 | A * | 12/1939 | Coxe | 242/316 |
| 2,283,816 | A * | 5/1942 | Loutrel | 43/23 |
| 2,482,192 | A * | 9/1949 | MacDonald | 43/25 |
| 2,787,857 | A * | 4/1957 | Schlegelmilch | 43/22 |
| 2,803,907 | A * | 8/1957 | Weaver | 42/124 |
| 2,814,147 | A * | 11/1957 | Henshaw | 43/22 |
| 4,463,512 | A * | 8/1984 | McCreery | 43/22 |

(Continued)

*Primary Examiner*—Kimberly S Smith
(74) *Attorney, Agent, or Firm*—Wood, Phillips, Katz, Clark & Mortimer

(57) ABSTRACT

The combination of a fishing reel support, a fishing reel, and a security assembly. The fishing reel support has a graspable body with a fishing reel mounting assembly. The fishing reel has a frame with an operating mechanism on the frame. The frame has a mounting stem and a mounting foot including first and second foot portions projecting generally oppositely away from the mounting stem. The security assembly prevents the fishing reel from being separated from the fishing reel support. The security assembly consists of first and second strap components that are joined to each other. A first foot portion is captive between the first strap component and the fishing reel support, with the second foot portion captive between the second strap component and the fishing reel support. The security assembly has a secured state and cooperates with the fishing reel support so that the fishing reel and security assembly cannot be separated from the fishing reel support with the security assembly in the secured state.

23 Claims, 5 Drawing Sheets

U.S. PATENT DOCUMENTS 4,688,346 A * 8/1987 Collins .......................... 43/22
5,012,607 A * 5/1991 Meschkat ...................... 43/25
5,377,441 A * 1/1995 Noda ............................ 43/22

* cited by examiner

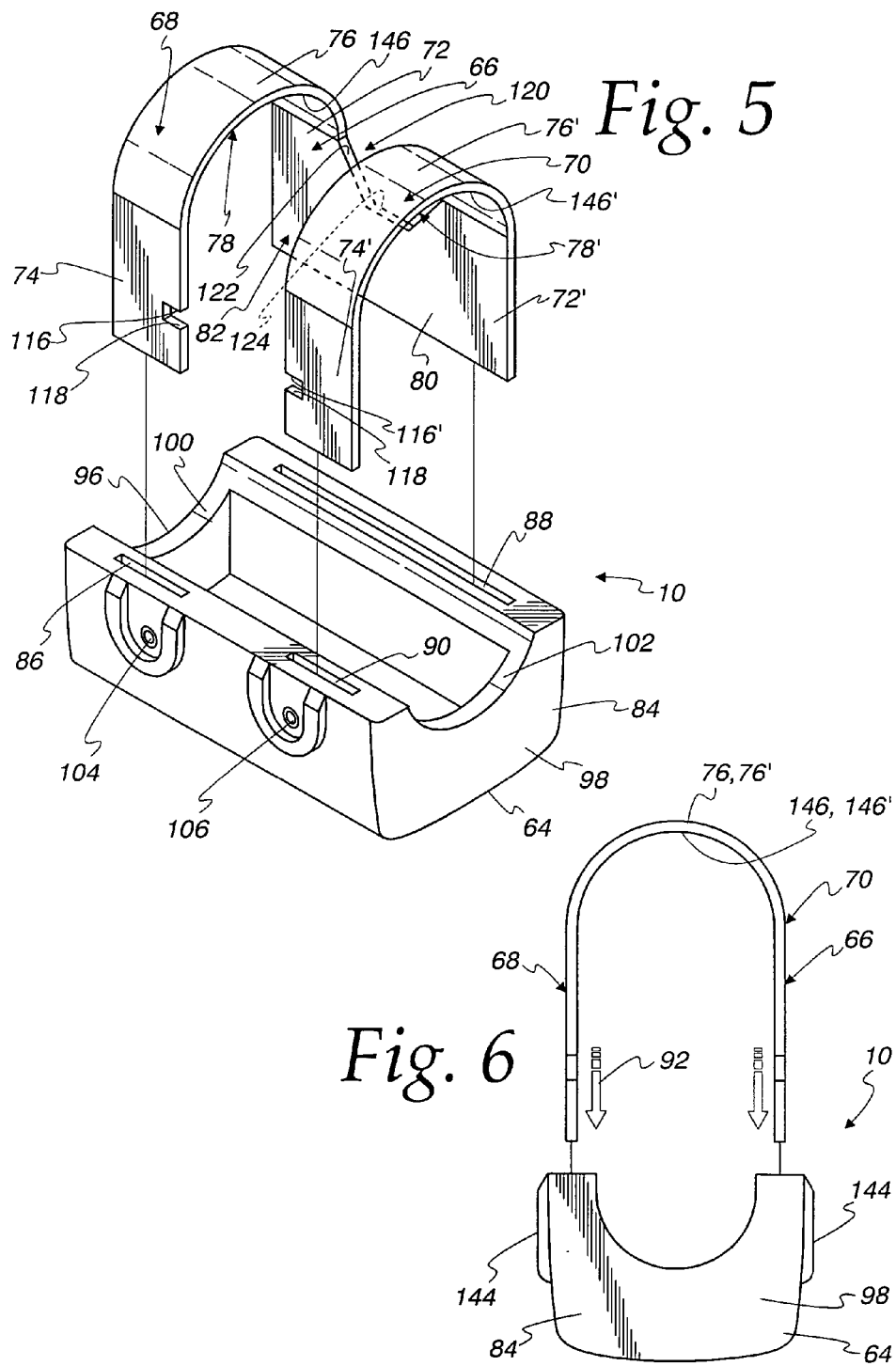

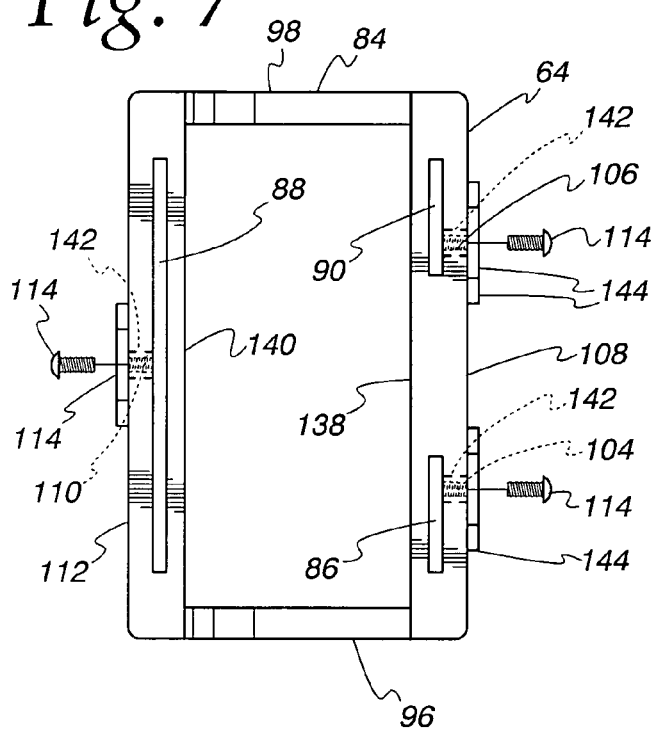
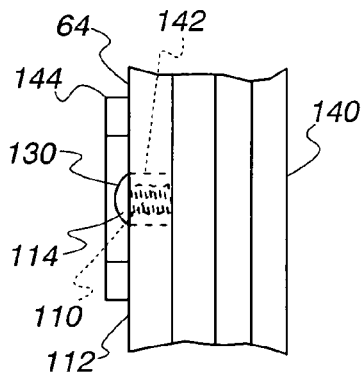
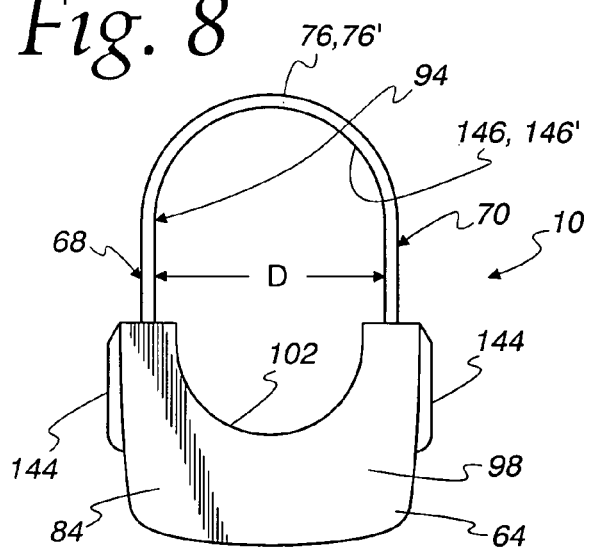
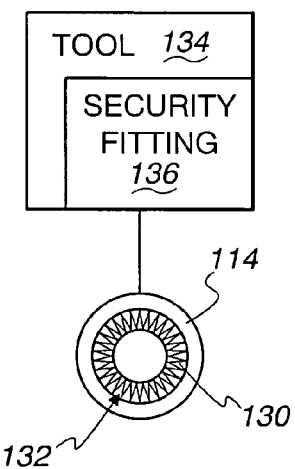

SYSTEM FOR SECURING A FISHING REEL TO A SUPPORT

BACKGROUND OF THE INVENTION

1. Field of the Invention

This invention relates to fishing reels and, more particularly, to a system for securing a fishing reel relative to a support therefor.

2. Background Art

Fishing remains a popular sport in many geographic locations, and particularly on the North American continent. Establishments that offer a full range of fishing tackle are required to stock rods and reels for both fresh water and salt water fishing. Within each of these categories, there is a range of durability offered as well as different styles, ranging from ultra light to heavy duty, to appeal to the wide range of tastes of anglers. Still further, these products are offered in a wide quality range. Consequently, a full line of fishing rods and reels involves potentially hundreds of different products in each establishment. The number of products is further increased by reason of the number of competing manufacturers in this industry.

In light of the many choices now available to anglers, it is becoming increasingly important to make fishing reels available for closer inspection by potential purchasers. At one point, lower end reels were displayed on rods in such a manner that they could be handled together and potentially operated on store premises. More expensive reels were, and continue to be, displayed in secured glass cases. For a prospective purchaser to make an inspection, an authorized individual is required to unlock a display case and tender the reel or reels to the prospective purchaser. In high volume operations, sales staffs may be required to keep track of a relatively large number of reels to make certain that they are not removed from the premises without authorization.

Displaying fishing reels in this manner has a number of drawbacks. First of all, a relatively large number of personnel may be required to promptly service consumers. Even then, it may be difficult to keep track of fishing reels that have been removed from a locked display. Further, the requirement that a sales person make the reels available inherently represents an inconvenience to a potential purchaser. Still further, when the reel is made available, the potential purchaser is required to either inspect the reel alone or assemble it to a rod so that he/she can get a "feel" for the rod as it would be used in the field. This is a time consuming inconvenience that potential consumers may not wish to contend with.

In this highly competitive industry, an alternative to the above conventional display techniques is to place even high end fishing reels operatively upon rods in such a manner that they can be easily picked up, inspected, and potentially operated by a prospective purchaser. While this offers consumers a convenience, it introduces a higher risk of theft. Many expensive fishing reels are miniaturized. Once small reels are removed from a fishing rod, they may be easily placed in a pocket or purse and removed from the premises without detection in the absence of some sort of security measure. A large volume of products may make impractical the incorporation of a security system in association with each product.

Heretofore, one intermediate measure taken is to secure the reel to a rod so that they cannot be easily separated. It is more difficult for a thief to leave undetected with a reel that is fixed to an elongate rod. Commonly, this attachment is made using plastic cable ties. However, these ties can be quickly severed by even a relatively unsophisticated thief as by using an end cutter or even a nail clipper.

Many security systems are available in other industries to effectively deter theft of portable consumer articles. These systems are used most commonly for portable electronics. However, while some fishing reels may warrant the use of sophisticated security measures, others do not. The type of security measures that are warranted are generally determined by comparing the cost of potential security systems against the anticipated loss in their absence or in the event that lower end systems are employed. As the fishing tackle industry evolves and more sophisticated and expensive reels are offered, affordable and effective systems for protecting these products against theft are increasingly in demand.

SUMMARY OF THE INVENTION

In one form, the invention is directed to the combination of a fishing reel support, a fishing reel, and a security assembly. The fishing reel support has a graspable body with a fishing reel mounting assembly. The fishing reel has a frame with an operating mechanism on the frame. The frame has a mounting stem and a mounting foot including first and second foot portions projecting generally oppositely away from the mounting stem. The security assembly prevents the fishing reel from being separated from the fishing reel support. The security assembly consists of first and second strap components that are joined to each other. The first foot portion is captive between the first strap component and the fishing reel support, with the second foot portion captive between the second strap component and the fishing reel support. The security assembly has a secured state and cooperates with the fishing reel support so that the fishing reel and security assembly cannot be separated from the fishing reel support with the security assembly in the secured state.

The first and second strap components may be in fixed relationship to each other.

In one form, the first and second strap components are each U-shaped with first and second legs joined by a bight portion. The first legs on the first and second strap components are joined to each other. There is a space between the second legs of the first and second strap components through which the mounting stem can be directed to allow the first and second strap components to respectively straddle the first and second mounting foot portions.

In one form, there is a unitary assembly that has a fixed configuration and includes the first and second strap components. The security assembly may further include a base to which the unitary assembly is joined with the security assembly in the secured state. The unitary assembly and base are joinable to place the security assembly in the secured state with the mounting foot and a part of the fishing reel support captive between the unitary assembly and base.

The unitary assembly may be formed as one piece.

In one form, the unitary assembly and base are fully separable, each from the other.

In one form, the unitary assembly and base are maintained together by at least one fastener.

In one form, the at least one fastener is a threaded fastener that has a head that can be engaged by a tool to effect turning of the at least one fastener.

The above components may further be provided in combination with a tool having a security fitting that is matched to a complementary fitting on the head of the fastener. The security and complementary fittings are engagable to facilitate turning of the at least one fastener by the tool.

In one form, the base has spaced first and second walls defining a first slot therebetween. With the security assembly in the secured state, a first part of the unitary assembly resides in the first slot so that the at least one fastener can be directed through at least the first wall to block removal of the first part of the unitary assembly from the first slot.

The base may further include spaced third and fourth walls defining a second slot therebetween that is spaced from the first slot. With the security assembly in the secured state, at least one of the first legs resides in the first slot and at least one of the second legs resides in the second slot.

With the security assembly in the secured state, at least a portion of the security assembly defines a first internal diameter within which at least a part of the mounting foot and the fishing reel support reside. The fishing reel support may be elongate with first and second spaced free ends. The fishing reel support has first and second spaced shoulders each with an effective diameter greater than the first diameter, that respectively block lengthwise shifting of the security assembly respectively to and past the first and second spaced free ends as would permit separation of the security assembly from the fishing reel support.

In one form, the fishing reel support is a fishing rod handle.

The fishing reel support may be a fishing rod handle with an associated rod having at least one eyelet through which fishing line can be directed.

In one form, the unitary assembly is a single formed piece of metal, with the base being formed as a molded plastic piece.

The fishing reel may be releasably fixedly maintained on the fishing reel support by the fishing reel mounting assembly independently of the security assembly.

The invention is further directed to the combination of a fishing reel support, a fishing reel and a security assembly. The fishing reel support has a graspable body with a fishing reel mounting assembly. The fishing reel has a frame and an operating mechanism on the frame. The frame has a mounting stem and a mounting foot with first and second foot portions projecting generally oppositely away from the mounting stem. The security assembly prevents the fishing reel from being separated from the fishing reel support. The fishing reel mounting assembly releasably fixedly maintains the fishing reel on the fishing reel support. The fishing reel support has an elongate element with spaced first and second free ends and first and second spaced shoulders respectively with first and second effective diameters. The security assembly has a first strap component, a second strap component, and at least one base. The first strap component is movable relative to the at least one base between a released position and a secured position. The first strap component and at least one base are joined to each other with the first strap component in at least the secured position. With the first strap component in the secured position, the first strap component and at least one base define a third internal diameter and surround the elongate element and the first mounting foot portion so that the first mounting foot portion resides between the elongate element and first strap component. The first shoulder abuts at least one of the first strap component and base to prevent shifting of the joined first strap component and at least one base relative to the elongate element to beyond the first free end of the elongate element. The second strap component is movable relative to the at least one base between a released position and a secured position. The second strap component and at least one base are joined to each other with the second strap component in at least the secured position for the second strap component. With the second strap component in its secured position, the second strap component and at least one base define a fourth internal diameter and surround the elongate element and the second mounting foot portion so that the second mounting foot portion resides between the elongate element and second strap component. The second shoulder abuts at least one of the second strap component and the at least one base to prevent shifting of the joined second strap component and at least one base relative to the elongate element to beyond the second free end of the elongate element.

In one form, the mounting stem resides between the first and second strap components and a) abuts the first strap component to block movement of the first strap component relative to the elongate element in a direction from the first free end of the elongate element towards the second free end of the elongate element, and b) abuts the second strap component to block movement of the second strap component relative to the elongate element in a direction from the second free end of the elongate element towards the first free end of the elongate element.

In one form, the elongate element is in the form of a fishing rod handle with an associated rod, the rod having at least one eyelet through which fishing line can be directed.

In one form, the security assembly has a secured state with the first and second strap components in their secured positions, and a released state. With the security assembly in the released state, the first and second strap components are fully separated from the at least one base.

In one form, the first and second strap components are interconnected as a unitary assembly that is joinable to the at least one base to place the security assembly in a secured state with the first and second strap components in their secured positions. The security assembly is in a released state with the first and second strap components in their release positions.

In one form, the first and second strap components are U-shaped and straddle the fishing rod handle. The at least one base is connected to the first and second strap components so that the elongate element is captive between the first and second straps and the at least one base.

The first and second strap components and at least one base may be maintained connected by at least one separate fastener.

In one form, the at least one base has first and second walls defining a first slot therebetween into which a part of the first strap is directed with the first strap in a secured position.

The invention is further directed to a security assembly for preventing a fishing reel, with a mounting stem and a mounting foot having first and second mounting foot portions projecting oppositely from the stem, from being separated from an elongate fishing reel support. The security assembly has a first U-shaped strap component and a second U-shaped strap component joined to the first U-shaped strap component. At least one base is provided to which the first and second strap components are joined with the security assembly in a secured state. The first and second U-shaped strap components are each configured to straddle an elongate fishing reel support and one of the mounting foot portions with the fishing reel mounted on the fishing reel support. The first U-shaped strap component and at least one base capture the elongate fishing reel support and the first mounting foot portion with the security assembly in the secured state. The second U-shaped strap component and at least one base capture the elongate fishing reel support and the second mounting foot portion with the security assembly in the secured state.

In one form, there is a unitary assembly that has a fixed configuration, including the first and second U-shaped strap components which each have first and second legs joined by a bight portion. The first legs on the first and second strap components are joined to each other. There is a space between the second legs on the first and second strap components through which the mounting stem can be directed to allow the first and second strap components to respectively straddle the first and second mounting foot portions.

The at least one base may consist of spaced first and second walls defining a first slot therebetween. With the security assembly in the secured state, a first part of the unitary assembly resides in the first slot and the at least one fastener can be directed through at least the first wall to block removal of the first part of the unitary assembly from the first slot.

The at least one base may include spaced third and fourth walls defining a second slot therebetween that is spaced from the first slot. With the security assembly in the secured state, at least one of the first legs resides in the first slot and at least one of the second legs resides in the second slot.

The above components may be provided in combination with a fishing reel attached to an elongate fishing reel support.

BRIEF DESCRIPTION OF THE DRAWINGS

FIG. 5 is an exploded perspective view of the security assembly in FIG. 3 with a base and strap assembly thereon separated from each other;

FIG. 6 is an exploded, end elevation view of the strap assembly and base in FIG. 5;

FIG. 7 is a plan view of the base in FIGS. 5 and 6;

FIG. 8 is a view as in FIG. 6 wherein the base and strap assembly are in a secured state;

FIG. 9 is an enlarged, fragmentary, elevation view showing a fastener that maintains a part of the strap assembly in a secured position relative to the base;

FIG. 10 is an enlarged, partially schematic, end elevation view of the fastener and an associated tool for effecting turning thereof;

DETAILED DESCRIPTION OF THE DRAWINGS

Figure 1:
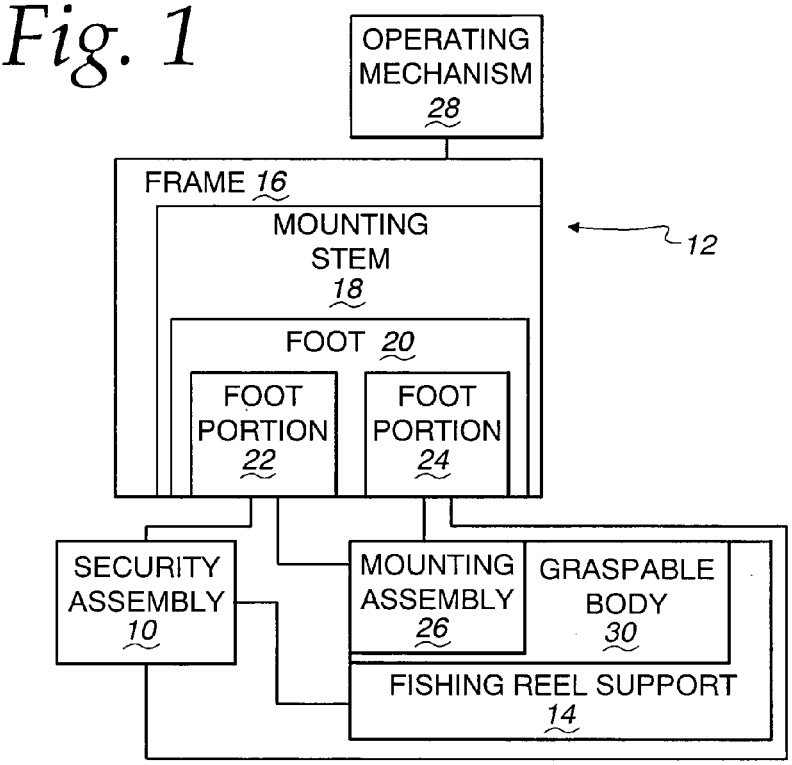
FIG. 1 is a schematic representation of a fishing reel mounted upon a fishing reel support and maintained on the fishing reel support by a security assembly, according to the present invention.

As seen schematically in FIG. 1, the invention is directed to a security assembly 10 for maintaining a fishing reel 12 upon a fishing reel support 14. The fishing reel 12 can take virtually a limitless number of different forms. That which is contemplated is any construction having a frame 16 with a mounting stem 18 with an associated mounting foot 20 through which the frame 16 is maintained upon the fishing reel support 14. More specifically, the mounting foot 20 has separate foot portions 22, 24 projecting oppositely away from the mounting stem 18. Through a mounting assembly 26, the foot portions 22, 24 are maintained engaged with the fishing reel support 14. There are currently myriad types of mounting assemblies 26 used to maintain foot portions 22, 24 operatively upon a fishing reel support.

The details of operation of the fishing reel 12 are not germane to the present invention. It suffices to say that the frame 16 supports an operating mechanism 28 through which line is controllably paid out and retrieved by a user. The invention is intended to encompass all known and devised operating mechanism 28 capable of accomplishing this.

The nature of the fishing reel support 14 may likewise vary considerably. For purposes of display, the fishing reel support 14 may consist of an elongate element that is graspable in the same manner that a user would grasp a conventional fishing rod handle. This allows the user to pick up the fishing reel support 14 and simulate operation of, or actually operate, the fishing reel 12. Alternatively, the fishing reel support 14 may be an actual fishing rod handle or an entire fishing rod, including the handle. Details of the invention will now be described with respect to one exemplary embodiment, with reference initially to FIGS. 2-10.

Figure 2:
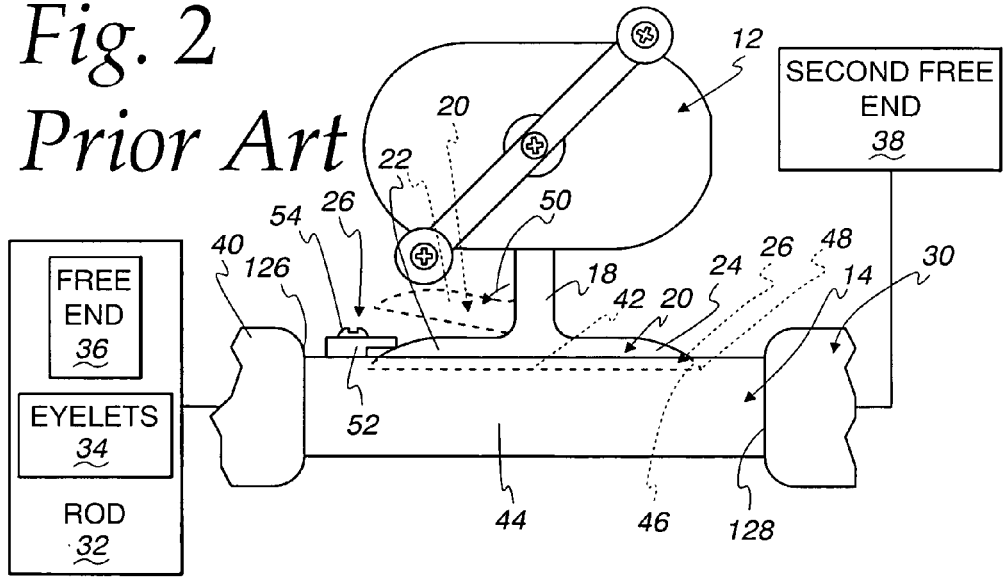
FIG. 2 is a fragmentary, side elevation view of a fishing reel support in the form of a fishing rod handle and associated rod with a fishing reel conventionally mounted to the fishing rod handle.
Figure 3:
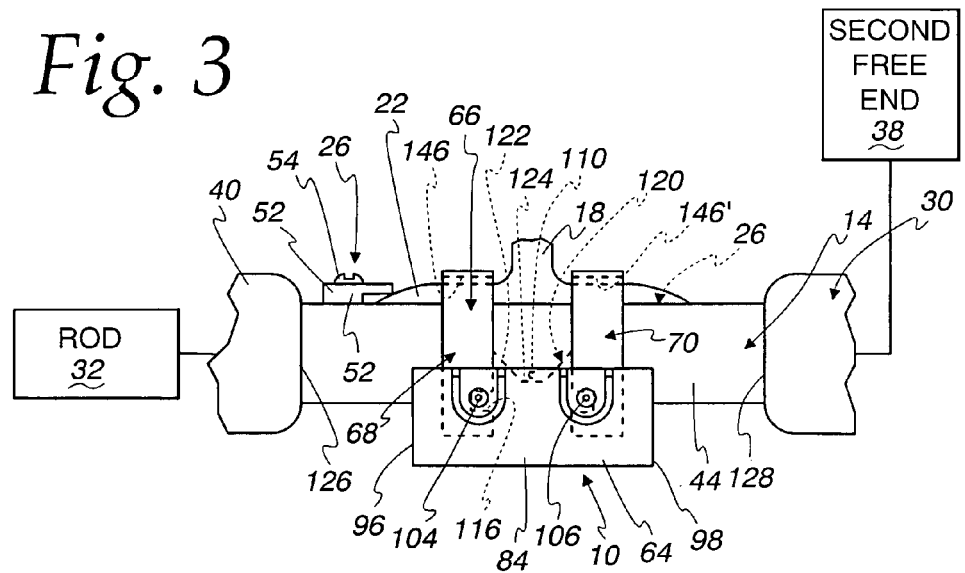
FIG. 3 is a view as in FIG. 2 wherein one form of the inventive security assembly is operatively mounted.

In FIGS. 2 and 3, one form of fishing reel support 14 is shown as a fishing rod handle. The handle 14 consists of a cushioned grip 30 that can be conveniently grasped by a user in such a manner as to facilitate repositioning of the fishing rod handle 14 and an associated rod 32 while operating the fishing reel 12. As noted previously, the fishing reel support 14 may consist of a simulated fishing tackle component or may be an actual fishing rod handle alone, or fishing rod handle attached to a rod. In this case, the rod 32 has at least one eyelet 34 through which line from the reel 12 can be directed. The rod 32 has a first free end 36, with the grip 30 terminating at an opposite, second free end 38. The fishing rod handle 14 has an additional component(s) 40 that may be a cushioned element to facilitate grasping by a user and/or to function as part of the reel mounting assembly 26, as hereinafter described.

The reel mounting assembly 26 in this case consists of an undercut seat 42 formed in an elongate section 44 on a fishing rod handle between the grip 30 and component 40. The seat 42 defines a V-shaped receptacle 46 opening toward the rod end 36. The receptacle 46 is configured to receive a free end 48 of the mounting foot portion 24 on the reel 12. The free end 48 on the mounting foot 20 can be directed into the receptacle 46 with the mounting foot 20 and associated reel inclined as shown in dotted lines in FIG. 2. Once the free end 48 is nested in the receptacle 46, the fishing reel 12 can be pivoted in the direction of the arrow 50 so that the foot portion 22 moves against the undercut seat 42. Thereafter, a clamping element 52 on the mounting assembly 26 can be borne against the foot portion 22 to captively maintain the mounting foot portion 22 against the undercut seat 42. The clamping element 52 is secured by an appropriate fastener 54. Through the mounting assembly 26, the fishing reel 12 is releasably secured to the fishing reel support 14 independently of the inventive security assembly 10.

Figure 4:
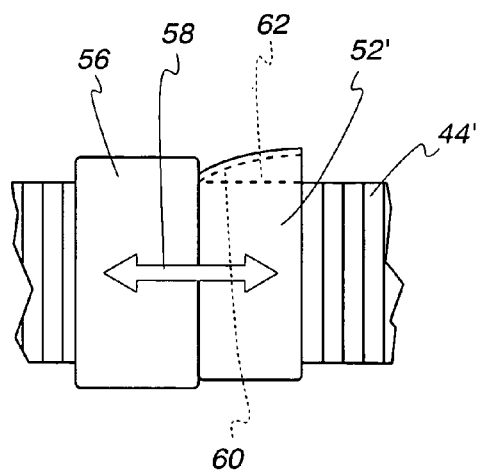
FIG. 4 is a fragmentary, elevation view of a modified form of conventional mechanism for maintaining a fishing reel on a fishing reel support.

As an alternative to the use of the clamping element 52 and fastener 54, a translatable clamping element 52', as shown in FIG. 4, can be used. In this embodiment, the elongate section 44' is threaded externally to engage internal threads on an adjusting ring 56 that is connectable to the clamping element 52' and rotatable relative thereto. By turning the adjusting ring 56, the adjusting ring 56 and associated clamping element 52' are translated lengthwise, as indicated by the double-headed arrow 58, relative to the elongate section 44'. By shifting the clamping element 52' towards the free end 38, a surface 60, bounding a V-shaped receptacle 62, opening oppositely to the receptacle 46, is caused to captively overlie the foot portion 22 to accomplish the same objective as the clamping element 52.

The exemplary structures in FIGS. 2-4, through which the fishing reel 12 is maintained operatively upon the fishing reel support 14, are but representative of the many other types of structures that exist in the industry and can be used with the inventive structure. With any of these structures, it is contemplated that a user be able to easily mount and detach the reel 12, as to allow interchanging of fishing reels 12 for a given fishing rod. This reel mounting structure, while enabling a user to set up different combinations of fishing components, for test purposes, also makes it possible for a thief to separate the reel 12, as at a point of purchase display, to abscond with the same. The security assembly 10 is intended to augment the conventional mounting assemblies used in the industry, with it being understood that the security assembly 10 could also alternatively be used at a display as the primary reel mounting structure.

Referring now to FIGS. 2, 3 and 5-10, the security assembly 10 can be seen to include a base 64 and a unitary strap assembly 66. The security assembly 10 will initially be described as consisting of two parts, with it being understood, as described hereinbelow, that multiple strap components and/or bases could be utilized in the same manner to secure the fishing reel 12.

The strap assembly 66 consists of a first strap component 68 and a second strap component 70 that are in spaced relationship. The first strap component 68 consists of first and second legs 72, 74, each with a substantial, flat width, joined by a bight portion 76 so as to define a U-shaped configuration bounding a receptacle 78.

The second strap component 70 has corresponding first and second legs 72', 74', each with a substantial, flat width, joined by a bight portion 76' so that the legs 72', 74' and bight portion 76' are U-shaped and bound a receptacle 78'.

The first legs 72, 72' are joined by a web 80 so that the relationship between the U-shaped strap components 68, 70 is fixed. The strap components 68, 70 could be connected so as to be movable relative to each other. However, the depicted configuration permits construction of the strap assembly 66 by bending a single, preformed, metal blank. The strap assembly 66 may be made by other methods and materials, as by molding, etc.

By reason of not having the second legs 74, 74' joined to each other, a space 82 is defined between the legs 74, 74' through which the fishing reel stem 18 can be moved to allow the strap components 68, 70 to be situated to respectively straddle the mounting foot portions 22, 24, as well as the underlying elongate section 44 on the fishing rod handle 14. That is, the mounting foot portion 22 and underlying portion of the elongate section 44 move into the receptacle 78 defined by the strap component 76, with the mounting foot portion 24 and underlying portion of the elongate section 44 moving likewise into the receptacle 78'. The strap assembly 66 is easily put in place by initially orienting the strap components 68, 70 so that the "U" shapes defined thereby open horizontally. The unitary strap assembly 66 can then be shifted relative to the fishing reel 12 so that the stem 18 moves into the space 82, with the web 80 passing beneath the elongate section 44. The unitary strap assembly 66 can then be pivoted through 90° to the operative state shown in FIG. 2.

Once this occurs, the strap assembly 66 and base 64 can be joined so that the base 64 bridges the legs 72, 72' and 74, 74'. To accommodate the strap assembly 66, the base 64 is formed with a body 84 having, in this case, three slots, 86, 88, 90, each opening upwardly to receive a portion of the strap assembly 66. More particularly, the slot 86 is dimensioned to receive the leg 74. The slot 88 is designed to receive the combined dimension of the legs 72, 72' and associated web 80. The slot 90 is dimensioned to receive the leg 74'.

In FIGS. 5 and 6, the base 64 and strap assembly 66 are shown in a release state, wherein they are fully separated from each other. By aligning the base 64 and strap assembly 66, as seen in FIGS. 5 and 6, the strap assembly 66 can be advanced in the direction of the arrow 92 to thereby direct the leg 74 into the slot 86, the leg 74' into the slot 90, and the legs 72, 72' and web 80 into the slot 88. The base 64 is configured so that with the legs 72, 72', 74, 74' and web 80 residing in their respective slots 86, 88, 90, an enclosed receptacle 94 is formed cooperatively by the base 64 and strap assembly 66.

To accomplish this, the body 84 of the base 64 is formed with a generally U-shaped construction with spaced end walls 96, 98. The end walls 96, 98 respectively have curved edges 100, 102 that are U-shaped opening towards the bight portions 76, 76' on the strap assembly 66.

The base 64 has threaded bores 104, 106 extending from one outside wall 108 into communication with the slots 86, 90, respectively. A like threaded bore 110 extends from the opposite outside wall 112 into communication with the slot 88. The bores 104, 106, 110 are each designed to receive a fastener, in this case, in the form of a security screw 114.

By changing the security assembly 10 from the release state of FIGS. 5 and 6, into the secured state of FIGS. 3 and 8, the leg 74 is caused to be placed in a secured position within the slot 86. In the secured position for the leg 74, a cut-out 116 aligns with the bore 104 in such a manner that with a threaded fastener 114 directed into the bore 104, the threaded fastener 114 moves into the slot 86, preferably through and past the cut-out 116, so that the fastener 114 resides directly over an edge portion 118 bounding a part of the cut out 116. Through this arrangement, the fastener 114 blocks removal of the leg 74 from the slot 86 and thereby precludes separation of the leg 74 from the base 64, i.e. movement of the leg 74 from a secured position to a release position.

A similar cut-out 116' is provided in the leg 74' and has an edge portion 118' to abut to a fastener 114 directed through the bore 106 into the slot 90 and preferably to and through the cut-out 116'. The edge portion 118' cooperates with the fastener 114 in the bore 106 the same way as the fastener 114 that is extended through the bore 104 cooperates with the edge portion 118.

The legs 72, 72' and associated web 80 are likewise maintained in a secured position by a fastener 114 extended through the bore 110. This particular fastener 114 extends into the slot 88 and to and through an opening 120 bounded by an edge 122. The edge 122 has a portion 124 directly beneath the fastener 114 extended through the bore 110.

With the security assembly 10 in the secured state of FIGS. 3 and 8, the receptacle 94 has an effective internal diameter D. This diameter D is less than a diameter of a shoulder 126 at a juncture between the component 40 and elongate section 44, and a shoulder 128 at a juncture between the grip 30 and elongate section 44. As a result, with the security assembly 10 in the secured state, the base 64 and/or strap assembly 66 abut to the shoulder 126 to prevent translational movement of the security assembly 10 to and past the free end 36 of the rod 32. Likewise, the base 64 and/or strap assembly 66 abut to the shoulder 128 to prevent translational movement of the security assembly 10 to and past the second free end 38 on the grip 30. At the same time, the mounting stem 18 at all times resides between the strap components 68, 70, whereby the reel 12 cannot be translated with the security assembly 10 to and past either end 36, 38 or separated from the support 14 by a transverse movement.

It should be understood that while the shoulders 126, 128 are shown at transition locations between the elongate section 44 and component 40 and cushion grip 30, the invention contemplates that the security assembly 10 can interact with any enlargement between the ends 36, 38, regardless of how, or for what purpose it is formed.

The base 64 and strap assembly 66 can be conveniently and readily assembled to each other and secured through the aforementioned fasteners 114. The fasteners 114 are preferably made to prevent unauthorized removal thereof. More particularly, as shown in FIGS. 9 and 10, the security fasteners 114 each has as head 130 with a conventional-type security fitting 132. The security fitting 132 may have any of a number of different conventional constructions which require a special tool 134 having a complementary security fitting 136 that fits the security fitting 132.

In this embodiment, the base 64 is shown to have a plastic molded body 84. This is not a requirement. The slots 86, 88, 90 can be formed in many different manners. In this particular embodiment, an inner wall 138 is formed to cooperate with the wall 108 to bound the slots 86, 90. A separate inner wall 140 cooperates with the wall 112 to bound the slot 88.

In the event that the body 84 is made from plastic, metal inserts 142 may be molded in place to define the bores 104, 106, 110.

As an additional, optional feature, as shown in FIG. 9, U-shaped bosses 144 may be formed integrally with the outside walls 108, 112 to bound a space within which the fastener heads 130 reside to present a neater appearance and avoid hangup with foreign objects upon the heads 130.

As seen in FIG. 3, with the security assembly 10 operatively in place and in the secured state, the combined mounting foot 20 and elongate section 44 are captive between strap surfaces 146, 146' and the curved edges 100, 102 on the base 64. The base 64 and strap assembly 66 may be relatively dimensioned so that the mounting foot 20 and elongate section 44 are either firmly or loosely captively held.

Many other modifications to the structure hereinabove described are contemplated. Only some of those modifications will be described below.

While the fasteners 114 are described to move into the slots 116, 116' and opening 120, the invention contemplates that one or more fasteners could be used to directly or indirectly captively bear a part of the strap assembly 66 against the base 64.

Figure 11:
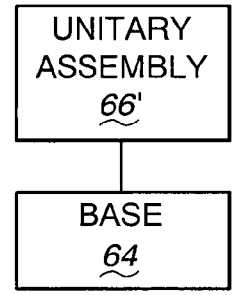
FIG. 11 is a schematic representation of one form of the inventive security assembly consisting of a unitary strap assembly and base, generally as described above.

As shown in FIG. 11, the invention contemplates virtually any type of interconnection of the unitary assembly 66 and base 64, other than that shown. What is desired is that the unitary assembly 66 and base 64 be joinable so as to preclude unauthorized separation of the fishing reel from the fishing reel support 14.

Figure 12:
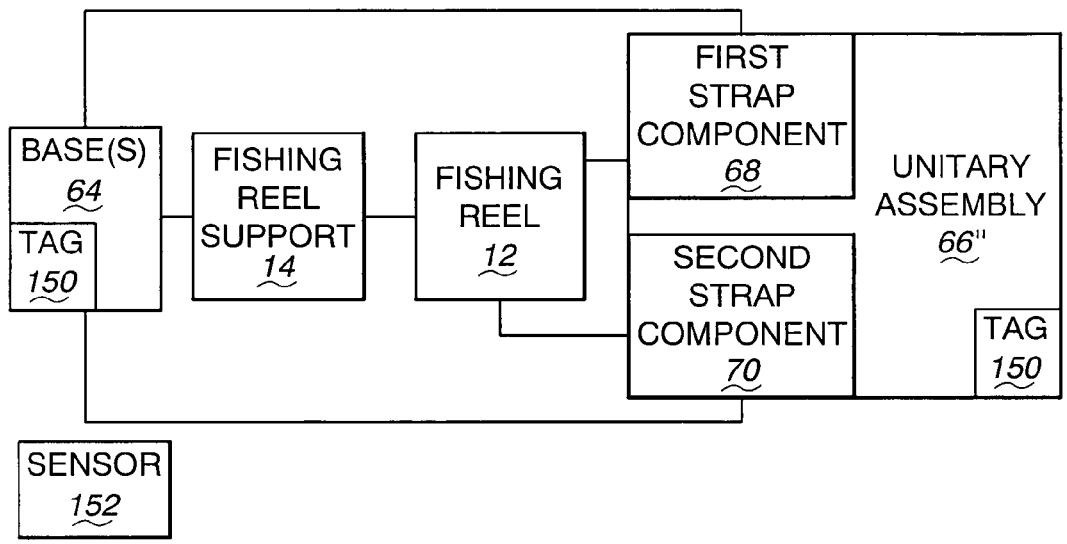
FIG. 12 is a schematic representation of one form of the inventive security assembly in association with a fishing reel and fishing reel support.
Figure 13:
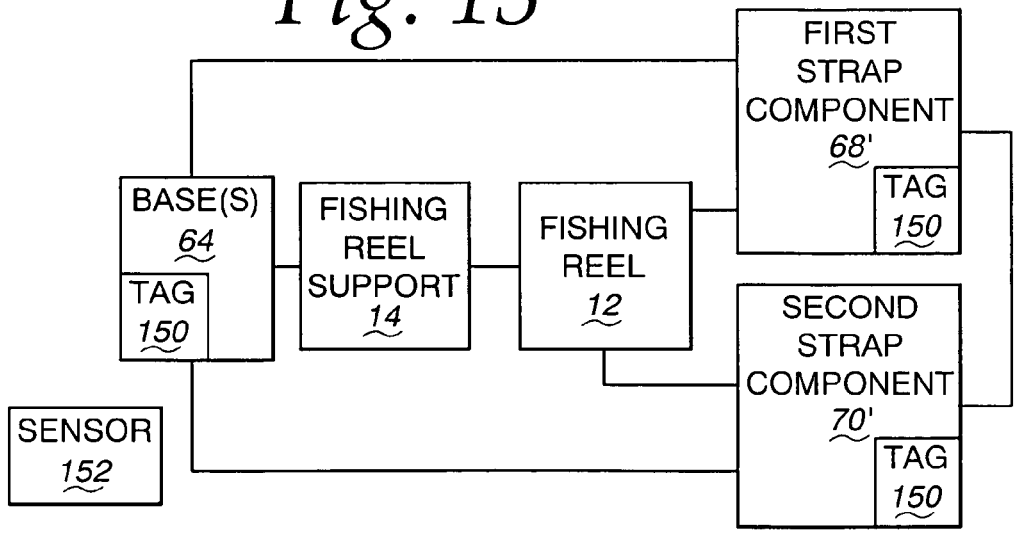
FIG. 13 is a view as in FIG. 12 of a modified form of security assembly.

As shown in FIGS. 12 and 13, the invention further contemplates that one or more bases 64 can be utilized. In FIG. 12, the strap components 68, 70 are shown as part of the unitary assembly 66 that may be joined to separate bases 64. As an alternative, the first and second strap components 68', 70' may be separate and joined to one or more bases 64. The separate bases 64 or strap components 68', 70' can be joined to each other to prevent complete separation of any part of the security assembly in a secured state therefor to prevent unauthorized removal of the security assembly and thereby potentially the fishing reel 12.

As just one example of variations contemplated in FIGS. 11-13, the unitary assembly 66" in FIG. 1 might be repositionable relative to the base or bases 64 without being fully separable therefrom. For example, a hinged arrangement may be provided to connect the base(s) 64 and unitary assembly 66".

In either of the constructions shown in FIGS. 12 and 13, a tag 150 may be incorporated into the bases 64, unitary assembly 66", and or strap components 58, 58', 70, 70' to be detected by an appropriate sensor 152, as at an exit door, to alert security personnel to an unauthorized removal of the security assembly 10 and associated rod or reel. The sensor 152 may cause the production of an audibly or visibly detectable signal for this purpose.

The foregoing disclosure of specific embodiments is intended to be illustrative of the broad concepts comprehended by the invention.

The invention claimed is:

1. In combination:
a fishing reel support comprising a graspable body with a fishing reel mounting assembly;
a fishing reel comprising a frame and an operating mechanism on the frame,
the frame comprising a mounting stem and a mounting foot comprising first and second foot portions projecting generally oppositely away from the mounting stem; and
a security assembly for preventing the fishing reel from being separated from the fishing reel support,
the security assembly comprising first and second strap components each with a substantial, flat width that are joined to each other so as to at all times be maintained together with the security assembly separated from the fishing reel and fishing reel support,
the first foot portion captive between the first strap component and the fishing reel support with the first strap component straddling the first foot portion,
the second foot portion captive between the second strap component and the fishing reel support with the second strap component straddling the second foot portion,
the security assembly having a secured state and cooperating with the fishing reel support so that the fishing reel and security assembly cannot be separated from the fishing reel support with the security assembly in the secured state; and wherein the first and second strap components are joined to each other through a base and each said strap component is U-shaped with first and second legs joined by a bight portion and the first legs on the first and second strap components are joined to each other and there is a space between the second legs of the first and second strap components through which the mounting stem can be directed to allow the first and second strap components to respectively straddle the first and second mounting foot portions, the first and second legs on the first strap component bridged by the base with the security assembly in the secured state.

2. The combination according to claim 1 wherein the first and second strap components are in fixed relationship to each other at all times by reason of being joined to each other including with the security assembly in the secured state and the first and second strap components separated from the fishing reel and fishing reel support.

3. The combination according to claim 1 wherein the fishing reel is releasably fixedly maintained on the fishing reel support by the fishing reel mounting assembly independently of the security assembly.

4. In combination:
a fishing reel support comprising a graspable body with a fishing reel mounting assembly;

a fishing reel comprising a frame and an operating mechanism on the frame, the frame comprising a mounting stem and a mounting foot comprising first and second foot portions projecting generally oppositely away from the mounting stem; and a security assembly for preventing the fishing reel from being separated from the fishing reel support, the security assembly comprising first and second strap components that are joined to each other, the first foot portion captive between the first strap component and the fishing reel support, the second foot portion captive between the second strap component and the fishing reel support, the security assembly having a secured state and cooperating with the fishing reel support so that the fishing reel and security assembly cannot be separated from the fishing reel support with the security assembly in the secured state, wherein the first and second strap components are in fixed relationship to each other with the first and second strap components separated from the fishing reel and fishing reel support, wherein the first and second strap components are each U-shaped with first and second legs joined by a bight portion and the first legs on the first and second strap components are joined to each other and there is a space between the second legs of the first and second strap components through which the mounting stem can be directed to allow the first and second strap components to respectively straddle the first and second mounting foot portions, wherein there is a unitary assembly that has a fixed configuration and comprises the first and second strap components, wherein the security assembly further comprises a base separate from the fishing reel and unitary assembly to which the unitary assembly is joined with the security assembly in the secured state, and the unitary assembly and base are joinable to place the security assembly in the secured state with the mounting foot and a part of the fishing reel support captive between the unitary assembly and base.

5. The combination according to claim 4 wherein the unitary assembly is formed as one piece.

6. The combination according to claim 4 wherein the unitary assembly and base are fully separable, each from the other.

7. The combination according to claim 4 wherein the unitary assembly and base are maintained together in the secured state by at least one fastener.

8. The combination according to claim 7 wherein the at least one fastener comprises a threaded fastener that has a head that can be engaged by a tool to effect turning of the at least one fastener.

9. The combination according to claim 8 further in combination with a tool having a security fitting that is matched to a complementary fitting on the head of the fastener, the security and complementary fittings engagable to facilitate turning of the at least one fastener by the tool.

10. The combination according to claim 4 wherein with the security assembly in the secured state at least a portion of the security assembly defines a first internal diameter within which at least a part of each of the mounting foot and the fishing reel support reside, the fishing reel support is elongate with first and second spaced free ends and the fishing reel support has first and second spaced shoulders each with an effective diameter greater than the first diameter that respectively block lengthwise shifting of the security assembly to and past the first and second spaced free ends as would permit separation of the security assembly from the fishing reel support.

11. The combination according to claim 10 wherein the fishing reel support comprises a fishing rod handle.

12. The combination according to claim 10 wherein the fishing reel support comprises a fishing rod handle with an associated rod, the rod having at least one eyelet through which fishing line can be directed.

13. The combination according to claim 4 wherein the unitary assembly comprises a single formed piece of metal and the base comprises a molded plastic piece.

14. In combination:

a fishing reel support comprising a graspable body with a fishing reel mounting assembly;

a fishing reel comprising a frame and an operating mechanism on the frame, the frame comprising a mounting stem and a mounting foot comprising first and second foot portions projecting generally oppositely away from the mounting stem; and a security assembly for preventing the fishing reel from being separated from the fishing reel support, the security assembly comprising first and second strap components that are joined to each other, the first foot portion captive between the first strap component and the fishing reel support, the second foot portion captive between the second strap component and the fishing reel support, the security assembly having a secured state and cooperating with the fishing reel support so that the fishing reel and security assembly cannot be separated from the fishing reel support with the security assembly in the secured state, wherein the first and second strap components are in fixed relationship to each other, wherein the first and second strap components are each U-shaped with first and second legs joined by a bight portion and the first legs on the first and second strap components are joined to each other and there is a space between the second legs of the first and second strap components through which the mounting stem can be directed to allow the first and second strap components to respectively straddle the first and second mounting foot portions, wherein there is a unitary assembly that has a fixed configuration and comprises the first and second strap components, the security assembly further comprising a base to which the unitary assembly is joined with the security assembly in the secured state, and the unitary assembly and base are joinable to place the security assembly in the secured state with the mounting foot and a part of the fishing reel support captive between the unitary assembly and base, wherein the unitary assembly and base are maintained together in the secured state by at least one fastener, wherein the at least one fastener comprises a threaded fastener that has a head that can be engaged by a tool to effect turning of the at least one fastener, wherein the base comprises spaced first and second walls defining a first slot therebetween and with the security assembly in the secured state a first part of the unitary assembly resides in the first slot and the at least one fastener can be directed through at least the first wall to block removal of the first part of the unitary assembly from the first slot.

15. The combination according to claim 14 wherein the base comprises spaced third and fourth walls defining a second slot therebetween that is spaced from the first slot and with the security assembly in the secured state at least one of the first legs resides in the first slot and at least one of the second legs resides in the second slot.

16. in combination:
a fishing reel support comprising a graspable body with a fishing reel mounting assembly;
a fishing reel comprising a frame and an operating mechanism on the frame,
the frame comprising a mounting stem and a mounting foot comprising first and second foot portions projecting generally oppositely away from the mounting stem; and
a security assembly for preventing the fishing reel from being separated from the fishing reel support,
the fishing reel mounting assembly releasably fixedly maintaining the fishing reel on the fishing reel support,
the fishing reel support comprising an elongate element with a length and spaced first and second free ends and first and second spaced shoulders respectively with first and second effective diameters,
the security assembly comprising a first strap component, a second strap component, and at least one base that is separate from the fishing reel,
the first strap component is movable relative to the at least one base between a released position and a secured position,
the first strap component and at least one base joined to each other with the first strap component in at least the secured position,
with the first strap component in the secured position, the first strap component and at least one base define a third internal diameter and surround the elongate element and the first mounting foot portion so that the first mounting foot portion resides between the elongate element and first strap component,
the first shoulder abutting at least one of the first strap component and the at least one base to prevent shifting of the joined first strap component and at least one base relative to the elongate element to beyond the first free end of the elongate element,
the second strap component movable relative to the at least one base between a released position and a secured position,
the second strap component and at least one base joined to each other with the second strap component in at least the secured position for the second strap component,
with the second strap component in its secured position, the second strap component and at least one base define a fourth internal diameter and surround the elongate element and the second mounting foot portion so that the second mounting foot portion resides between the elongate element and second strap component,
the second shoulder abutting at least one of the second strap component and the at least one base to prevent shifting of the joined second strap component and at least one base relative to the elongate element to beyond the second free end of the elongate element,
the first strap component and at least one base changeable from a separated position into a relative position wherein the first strap component is in its secured position, by movement of the at least one base and first strap component from the separated position towards each other in a path that extends transversely to the length of the elongate element.

17. The combination according to claim 16 wherein the mounting stem resides between the first and second strap components and a) abuts the first strap component to block movement of the first strap component relative to the elongate element in a direction from the first free end of the elongate element towards the second free end of the elongate element, and b) abuts the second strap component to block movement of the second strap component relative to the elongate element in a direction from the second free end of the elongate element towards the first free end of the elongate element.

18. The combination according to claim 16 wherein the security assembly has a secured state with the first and second strap component in their secured positions and a released state and with the security assembly in the secured state, the first and second strap components are fully separable from the at least one base by relative movement of the first and second components and at least one base away from each other in a path that extends transversely to the length of the elongate element.

19. The combination according to claim 17 wherein the elongate element comprises a fishing rod handle with an associated rod, the rod having at least one eyelet through which a fishing line can be directed.

20. The combination according to claim 17 wherein the first and second strap components are interconnected as a unitary assembly that is joinable to the at least one base to place the security assembly in a secured state with the first and second strap components in their secured positions, the security assembly in a released state with the first and second strap components in their release positions.

21. The combination according to claim 19 wherein the first and second strap components are each U-shaped with a flat width and straddle the fishing rod handle and the at least one base is connected to the first and second strap components so that the elongate element is captive between the first and second straps and the at least one base.

22. The combination according to claim 21 wherein the first and second strap components and at least one base are maintained connected by at least one separate fastener.

23. In combination:
a fishing reel support comprising a graspable body with a fishing reel mounting assembly;
a fishing reel comprising a frame and an operating mechanism on the frame,
the frame comprising a mounting stem and a mounting foot comprising first and second foot portions projecting generally oppositely away from the mounting stem; and
a security assembly for preventing the fishing reel from being separated from the fishing reel support,
the fishing reel mounting assembly releasably fixedly maintaining the fishing reel on the fishing reel support,
the fishing reel support comprising an elongate element with spaced first and second free ends and first and second spaced shoulders respectively with first and second effective diameters,
the security assembly comprising a first strap component, a second strap component, and at least one base,
the first strap component is movable relative to the at least one base between a released position and a secured position,
the first strap component and at least one base joined to each other with the first strap component in at least the secured position,
with the first strap component in the secured position, the first strap component and at least one base define a third internal diameter and surround the elongate element and the first mounting foot portion so that the first mounting foot portion resides between the elongate element and first strap component, the first shoulder abutting at least one of the first strap component and the at least one base to prevent shifting of the joined first strap component and at least one base relative to the elongate element to beyond the first free end of the elongate element, the second strap component movable relative to the at least one base between a released position and a secured position, the second strap component and at least one base joined to each other with the second strap component in at least the secured position for the second strap component, with the second strap component in its secured position, the second strap component and at least one base define a fourth internal diameter and surround the elongate element and the second mounting foot portion so that the second mounting foot portion resides between the elongate element and second strap component, the second shoulder abutting at least one of the second strap component and the at least one base to prevent shifting of the joined second strap component and at least one base relative to the elongate element to beyond the second free end of the elongate element, wherein the mounting stem resides between the first and second strap components and a) abuts the first strap component to block movement of the first strap component relative to the elongate element in a direction from the first free end of the elongate element towards the second free end of the elongate element, and b) abuts the second strap component to block movement of the second strap component relative to the elongate element in a direction from the second free end of the elongate element towards the first free end of the elongate element, wherein the first and second strap components are interconnected as a unitary assembly that is joinable to the at least one base to place the security assembly in a secured state with the first and second strap components in their secured positions, the security assembly in a released state with the first and second strap components in their release positions, wherein the at least one base comprises spaced first and second walls defining a first slot therebetween into which a part of the first strap is directed with the first strap in a secured position.

* * * * *